United States Patent [19]
Taylor

[11] Patent Number: 5,699,130
[45] Date of Patent: Dec. 16, 1997

[54] DIGITAL VIDEO AND AUDIO SYSTEMS USING NANO-MECHANICAL STRUCTURES

[75] Inventor: Stephen Francis Taylor, Pacific Palisades, Calif.

[73] Assignee: Taylor Group of Companies, Inc., Santa Monica, Calif.

[21] Appl. No.: 660,832

[22] Filed: Jun. 10, 1996

Related U.S. Application Data

[60] Continuation of Ser. No. 459,416, Jun. 2, 1995, which is a division of Ser. No. 245,246, May 17, 1994.

[51] Int. Cl.$^6$ ............................................. H04N 5/74
[52] U.S. Cl. ............................................. 348/758; 348/744
[58] Field of Search ............................................. 348/771, 761, 348/770, 756, 755, 744, 759, 750, 758

[56] References Cited

U.S. PATENT DOCUMENTS

| | | | |
|---|---|---|---|
| 2,983,786 | 5/1961 | Rogers | 348/758 |
| 3,106,606 | 10/1963 | Fuller et al. | 348/758 |
| 4,497,023 | 1/1985 | Moorer . | |
| 4,596,992 | 6/1986 | Hornbeck . | |
| 4,615,595 | 10/1986 | Hornbeck . | |
| 4,680,579 | 7/1987 | Ott . | |
| 4,685,134 | 8/1987 | Wine . | |
| 4,736,333 | 4/1988 | Mead et al. . | |
| 4,818,938 | 4/1989 | Sattin et al. . | |
| 4,882,617 | 11/1989 | Vriens | 348/756 |
| 4,893,256 | 1/1990 | Rutherfoord et al. . | |
| 4,905,094 | 2/1990 | Pocock et al. . | |
| 4,974,095 | 11/1990 | Arov | 348/758 |
| 5,032,002 | 7/1991 | Fonneland et al. | 350/162.12 |
| 5,065,345 | 11/1991 | Knowles et al. . | |
| 5,109,482 | 4/1992 | Bohrman . | |
| 5,111,409 | 5/1992 | Gasper et al. . | |
| 5,119,474 | 6/1992 | Beitel et al. . | |
| 5,162,787 | 11/1992 | Thompson et al. . | |
| 5,170,156 | 12/1992 | DeMond et al. . | |
| 5,214,419 | 5/1993 | DeMond et al. | 340/794 |
| 5,231,388 | 7/1993 | Stolz . | |
| 5,240,818 | 8/1993 | Mignardi et al. . | |
| 5,303,055 | 4/1994 | Hendrix et al. | 348/761 |
| 5,312,513 | 5/1994 | Florence et al. . | |
| 5,312,779 | 5/1994 | Nelson . | |
| 5,335,022 | 8/1994 | Braun et al. | 348/744 |
| 5,365,283 | 11/1994 | Doherty et al. . | |
| 5,371,543 | 12/1994 | Anderson . | |
| 5,386,253 | 1/1995 | Fielding | 348/745 |
| 5,424,868 | 6/1995 | Fielding et al. . | |
| 5,446,479 | 8/1995 | Thompson et al. | 345/139 |
| 5,452,024 | 9/1995 | Sampsell . | |
| 5,452,138 | 9/1995 | Mignardi et al. . | |
| 5,459,602 | 10/1995 | Sampsell . | |

FOREIGN PATENT DOCUMENTS

WO95/30924  11/1995  WIPO .

*Primary Examiner*—Victor R. Kostak
*Attorney, Agent, or Firm*—Merchant, Gould, Smith, Edell, Welter & Schmidt

[57] ABSTRACT

Applications of digitally-controlled nano-mechanical structures are described, including both digital video and audio systems. For video systems, the nano-mechanical structures comprise resonant membrane spatial light modulators (SLMs), which are used in either transmissive mode or reflective mode operations to generate images. For audio systems, the nano-mechanical structures comprise resonant membrane spatial acoustic modulators (SAMs), which are used in reflective mode operations to generate sounds. For both SLMs and SAMs, a flexible support layer is deformed upon application of an electrical potential to the device, thus altering either the optical or acoustical characteristics of the device, respectively.

12 Claims, 9 Drawing Sheets

DIGITAL VIDEO AND AUDIO SYSTEMS USING NANO-MECHANICAL STRUCTURES

This is a File Wrapper Continuation of application Ser. No. 08/459,416, filed Jun. 2, 1995, which is a divisional of U.S. patent application Ser. No. 08/245,246, filed on May 17, 1994.

BACKGROUND OF THE INVENTION

1. Field of the Invention

This invention relates in general to digital video and audio systems, and in particular, to digital video and audio systems comprised of digitally-controlled nano-mechanical structures.

2. Description of Related Art

It is well known in the art to fabricate optically dynamic nano-mechanical structures. Typically, integrated chip technology is used to fabricate the nano-mechanical structures. Such devices have been fabricated by Etalon, Inc. and Texas Instruments.

One well known nano-mechanical structure is an interference filter comprised of thin films of materials of different refractive indices layered in stacks, so that they interact with light in numerous ways. The surfaces created by these layers are dynamic or active because small voltages can control their movement and geometry to alter their optical properties. For example, the interference filters can be tuned to different wavelengths of light.

However, there are a number of limitations of the prior art. For example, the prior art merely teaches fabrication methods and a limited number of applications for the nano-mechanical structures.

SUMMARY OF THE INVENTION

To overcome the limitations in the prior art described above, and to overcome other limitations that will become apparent upon reading and understanding the present specification, the present invention discloses applications of digitally-controlled nano-mechanical structures, including both digital video and audio systems. For video systems, the nano-mechanical structures comprise resonant membrane spatial light modulators (SLMs), which are used in either transmissive mode or reflective mode to generate images. For audio systems, the nano-mechanical structures comprise resonant membrane spatial acoustic modulators (SAMs), which are used in reflective mode to generate sounds.

BRIEF DESCRIPTION OF THE DRAWINGS

Referring now to the drawings in which like reference numbers represent corresponding parts throughout:

FIGS. 16A and 16B illustrate the structure of a SAM, wherein FIG. 16A illustrates a Sam in full excursion, FIG. 16B illustrates a SAM in a quiescent state, and FIGS. 16A and 16B both illustrate the necessary control electronics for controlling the operation of the SAMs;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

Figure 1:
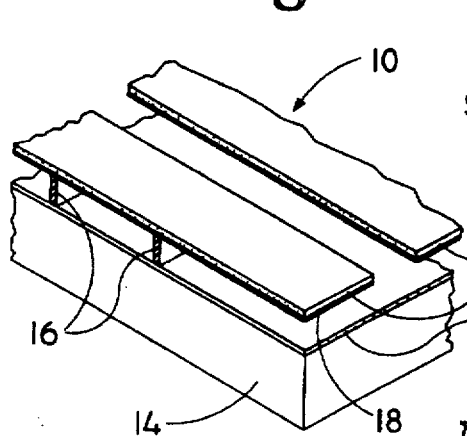
FIG. 1 illustrates the structure of a resonant membrane spatial light modulator (SLM)

FIG. 1 illustrates the structure of a resonant membrane spatial light modulator (SLM) 10. Using thin film technology, the SLM 10 is an optically resident cavity or interference filter. Deposited on a substrate, the SLM 10 is a sandwich comprising a primary mirror or lens 12, a support structure 14, a spacer grid 16 to provide an air gap, a secondary mirror or lens 18, and a flexible support layer 20. The use of transparent substrates in either subtractive or additive color schemes allows the SLMs to act in either transmissive or reflective mode.

Figure 2A:
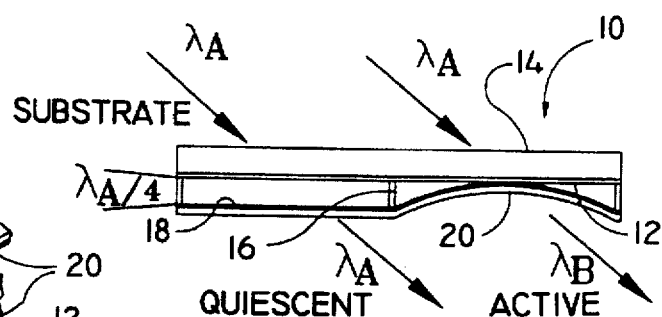
FIGS. 2A and 2B illustrate the optical behavior of the resident membrane SLM.
Figure 2B:
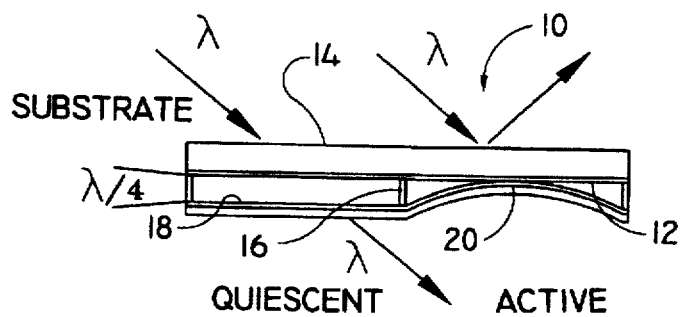

FIGS. 2A and 2B illustrate the optical behavior of the resonant membrane SLM 10. In quiescent mode, the SLM 10 acts like a narrowband filter whose center wavelength $\lambda$ is determined by the size (which corresponds to $\lambda/4$) of the air gap. By applying an electrical potential to the layers, the secondary mirror or lens 18 and support layer 20 are deformed, thus altering the optical characteristics of the SLM 10. Information is typically represented in the form of an amplitude change in the electrical control signal.

FIG. 2A shows a transmissive mode SLM 10, wherein the secondary lens 18 and support layer 20 are deformed to attenuate light at the center wavelength $\lambda_A$, as shown in the comparison between the sides labeled "quiescent" and "active". FIG. 2B shows a reflective mode SLM 10, wherein the secondary mirror 18 and support layer 20 are deformed to reflect light at the center wavelength $\lambda$, as shown in the comparison between the sides labeled "quiescent" and "active".

SLMs have numerous advantageous characteristics. For example, one advantage is that the multilayer films are designed to exhibit precise spectral behavior, as well as extremely low losses. Another advantage is that the SLMs are non-polarizing. Still another advantage is that the SLMs have low power requirements, i.e., in line with those of liquid crystal displays.

A DIGITAL VIDEO SYSTEM USING TRANSMISSIVE MODE SLMS

Figure 3:
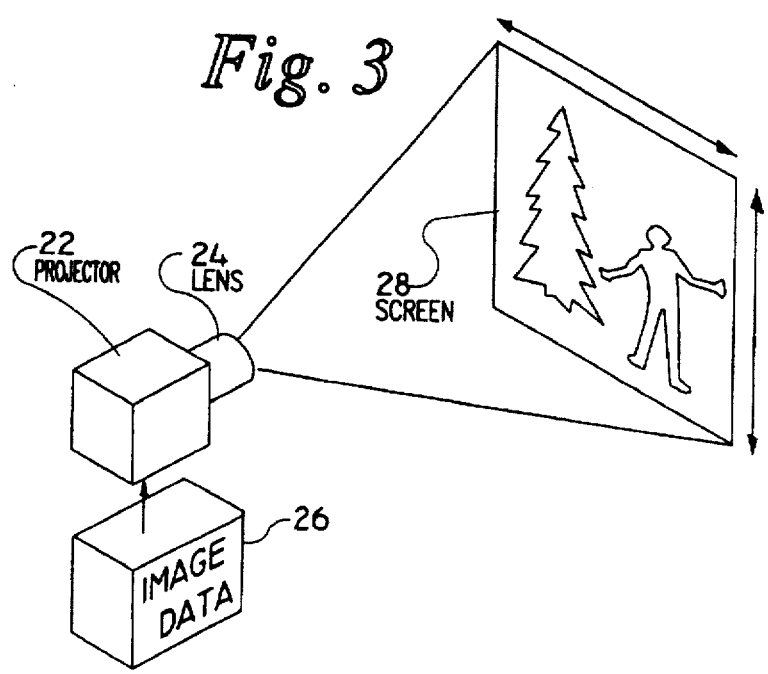
FIG. 3 illustrates the application of transmissive mode SLMs to digital video systems.

FIG. 3 illustrates the application of transmissive mode SLMs to digital video systems. A video system includes a projector 22 having a special lens 24, a device 26 for storing image data, and a screen 28. The lens 24 is comprised of an array of stacked SLMs, wherein one or more of the stacks forms a pixel of the lens 24. Each of the SLMs in a stack is fabricated to pass all wavelengths transparently when "off" and to attenuate a particular center wavelength$\lambda$ when "on". The entire stack of SLMs can be controlled electronically by digital data streams to pass only a particular color for the pixel. Thus, as light from the projector 22 is transmitted through the lens 24, the pixels project an image onto the screen 28. Sequential digital data streams can be used to control the stacks so that moving images are projected onto the screen 28.

Figure 4:
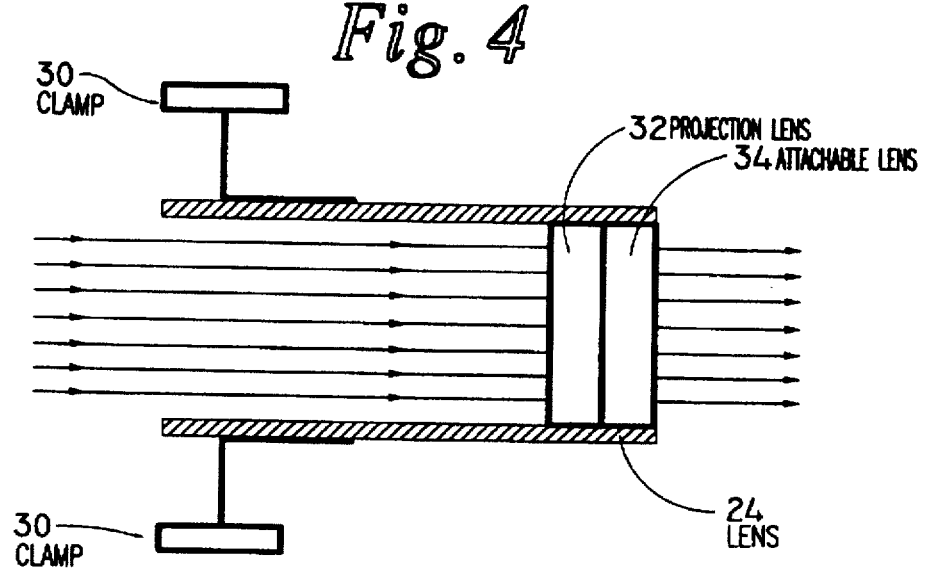
FIG. 4 illustrates the components of a lens comprised of transmissive mode SLMs.

FIG. 4 illustrates the components of the lens 24 comprised of transmissive mode SLMs. Clamps 30 are used to attach the outer casing of the lens 24 to the projector 22. Light from the projector 22 is transmitted through a resident projection lens 32 and then an attachable lens 34 containing an array of stacked transmissive mode SLMs. Pixels for the lens 34 are comprised of one or more stacks of SLMs. The pixels are controlled by digital data streams to pass only selected wavelengths of light. For example, a stack of 64 SLMs each having a passband of 6 nm could pass selected wavelengths ranging from 400 nm to 790 nm. When all the SLMs in the stack are in the "off" position, white light is projected from the pixel. When some or all of the SLMs are in the "on" position, a selected color is projected from the pixel. When all the pixels are combined, an image is projected onto a screen.

Figure 5:
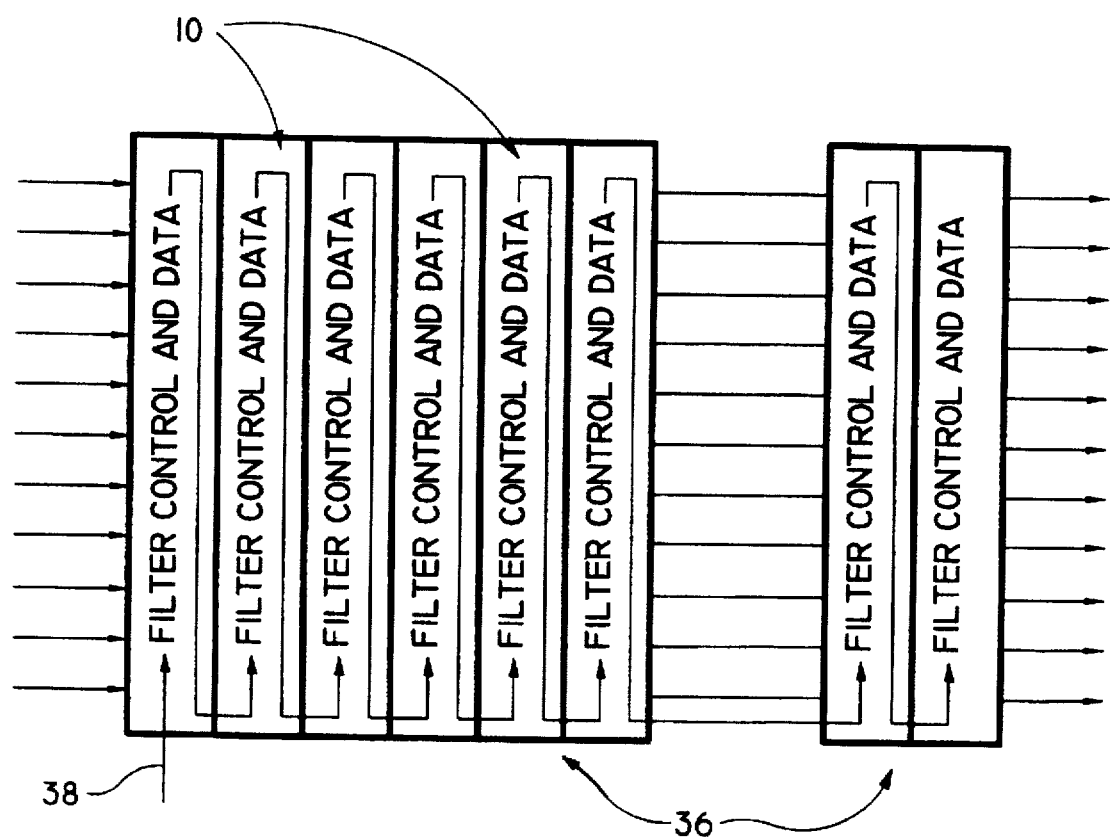
FIG. 5 illustrates the structure of a stack of transmissive mode SLMs 10.

FIG. 5 illustrates the structure of a stack 36 of transmissive mode SLMs 10. Filter, control and data lines 38 connect to all the SLMs 10. The stack 36 is 64 nm deep and each SLM 10 is transparent except for its specific 6 nm passband. White light from a projector is transmitted through the stack 36, and depending on how the stack 36 is configured by the filter, control and data lines 38, the stack 36 will either be transparent or it will only pass certain wavelengths of light. When taken together, the stack 36 transmits a color, and under a Fourier theory, the transmitted light can be decomposed to all wavelengths in the visible spectrum. Everything that is outside of the passband of the stack 36 is attenuated.

Figure 6A:
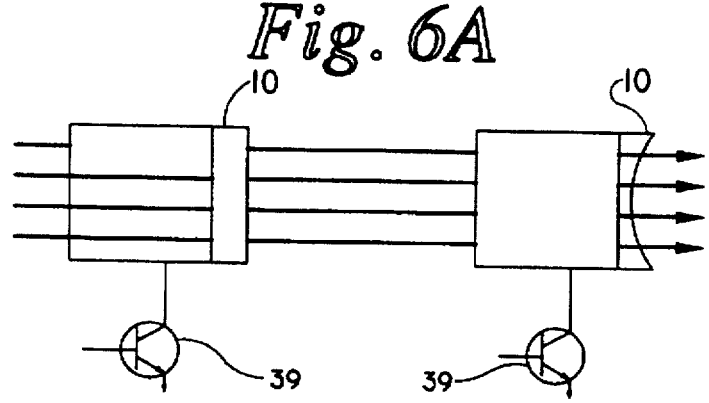
FIGS. 6A and 6B illustrate the operation of the stack of transmissive mode SLMs.
Figure 6B:
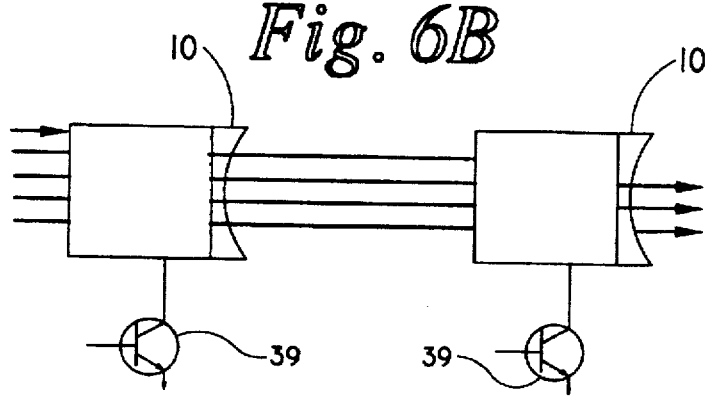

FIGS. 6A and 6B illustrate the operation of the stack of transmissive mode SLMs 10, operated by control electronics 39, wherein some of the SLMs 10 are in the "on" position. In the example of FIG. 6A, the light is passed by those SLMs 10 that are in an "off" position, and specific wavelengths of the light are attenuated by those SLMs 10 that are in an "on" position. In the example of FIG. 6B, all the SLMs 10 are in an "on" position, which causes the attenuation of some wavelengths.

A DIGITAL VIDEO SYSTEM USING REFLECTIVE MODE SLMS

Figure 7:
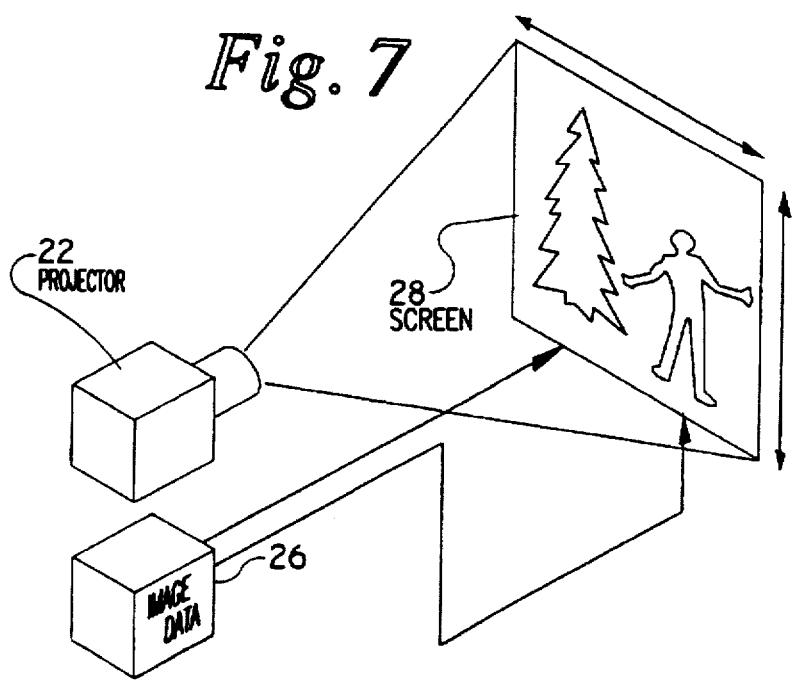
FIG. 7 illustrates the application of reflective mode SLMs to digital video systems.

FIG. 7 illustrates the application of reflective mode SLMs to digital video systems. A video system includes a projector 22, a special screen 28, and a device 26 for storing image data. The screen 28 is comprised of an array of stacked SLMs, wherein one or more of the stacks forms a pixel of the screen 28. Each of the SLMs in a stack is fabricated to pass light transparently when "off" and to reflect light at a particular center wavelength $\lambda$ when "on". The entire stack of SLMs can thus be controlled electronically by digital data streams to reflect only a particular color for the pixel. As light from the projector 22 is projected onto the screen 28, the pixels are controlled to reflect an image. Sequential digital data streams can be used to control the stacks so that moving images are reflected from the screen 28.

Figure 8:
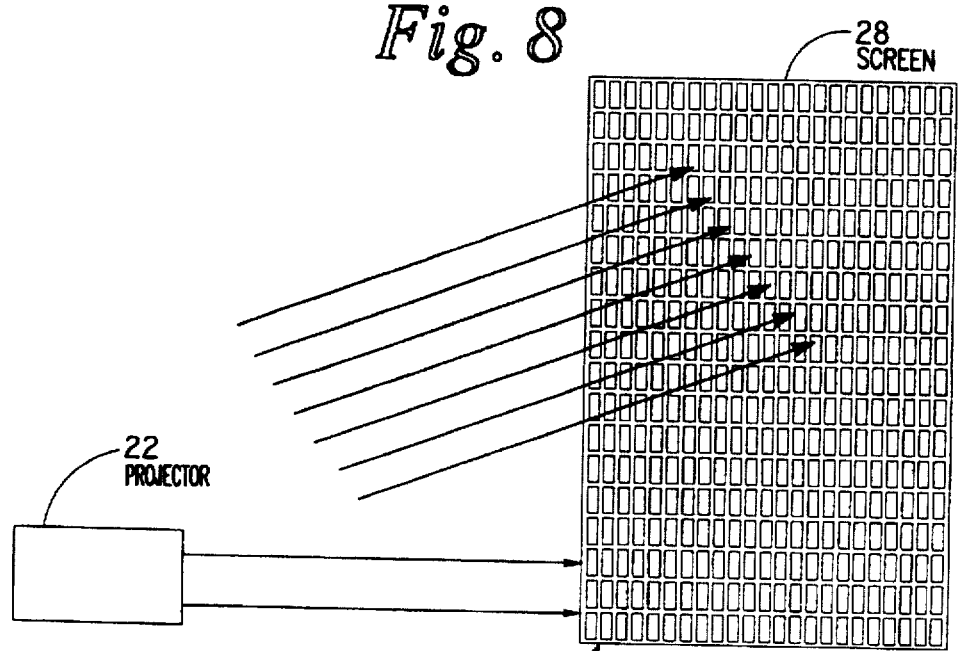
FIG. 8 illustrates the components of the screen shown in FIG. 7.

FIG. 8 illustrates the components of the screen 28 shown in FIG. 7. The screen 28 is deformable so that it can be configured into a variety of topologies, such as circular or flat shapes. A plurality of pixels 40 define the screen 28, wherein the number of pixels 40 per square inch define the resolution of the screen 28. When the projected light strikes the pixels 40, specific wavelengths are absorbed or reflected with or without attenuation. Moreover, the projector 22 can modulate the intensity of the light projected onto the screen 28 to produce intensity variations in the reflected images. In addition, the SLMs can be refreshed at a rate ranging from 100 microseconds to 50 milliseconds for moving images depending on the motion resolution required.

Figure 9:
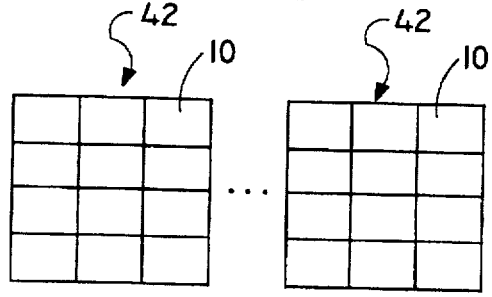
FIG. 9 illustrates a tiled group of adjoining reflective mode SLMs that form a pixel on the screen.

FIG. 9 illustrates tiled groups 42 of adjoining reflective mode SLMs 10 that form pixels on the screen. Depending on the amount of resolution required, each tiled group 42 of adjoining SLMs 10 provides redundant operation to increase the surface area of the pixel. For example, to achieve a dot resolution equal to 16 mm film (which is the resolving power of 70 mm film projected onto a 60 foot screen), each pixel would comprise a 40×40 array of SLMs 10, wherein each SLM 10 has a surface area of 400 microns by 400 microns.

Figure 10:
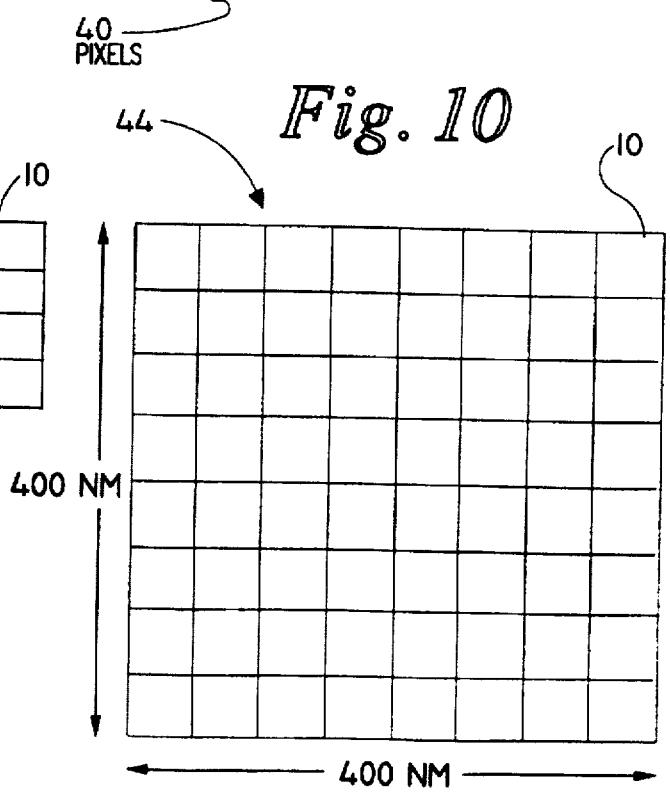
FIG. 10 further illustrates another tiled group 44 of SLMs having a total surface area of 400 nm by 400 nm.
Figure 11:
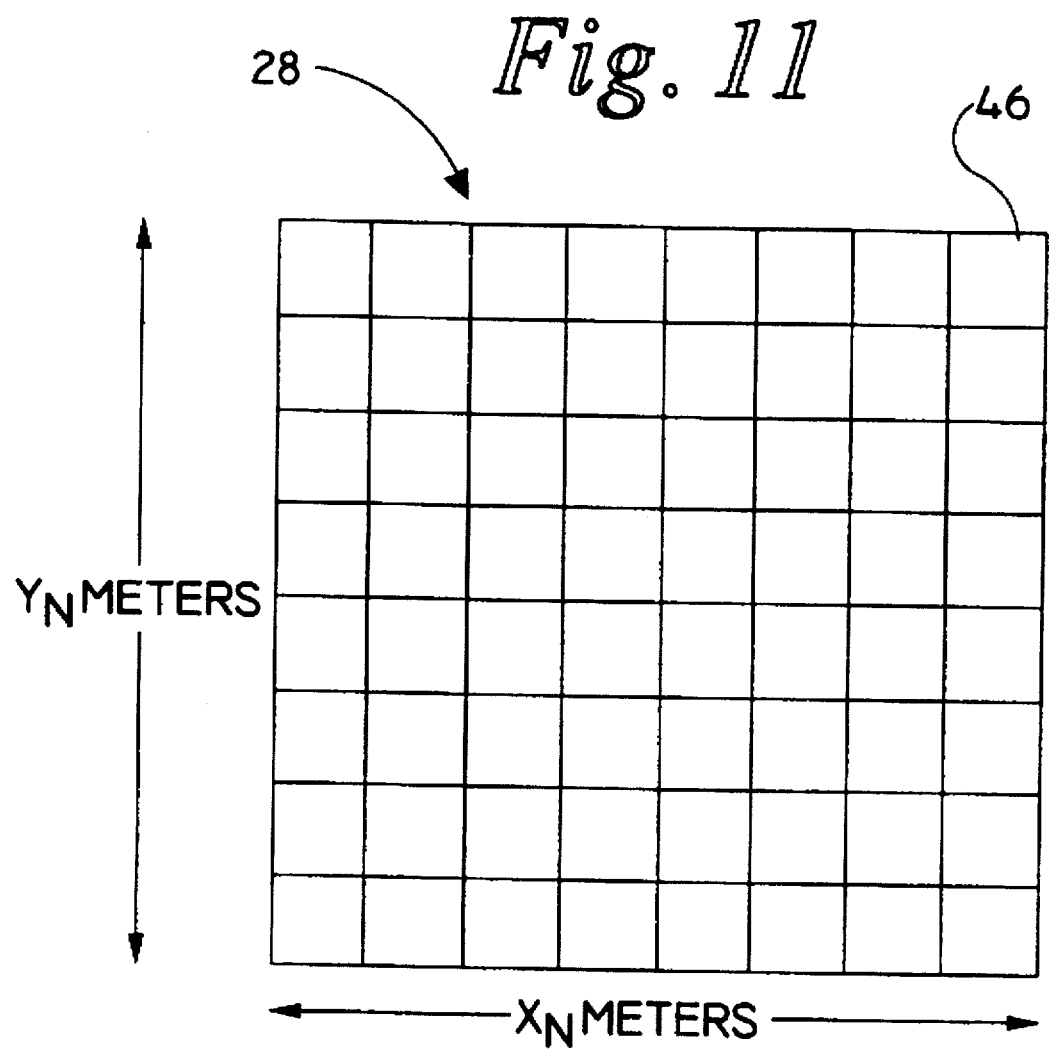
FIG. 11 illustrates how the pixels are combined together to form a screen of a desired size.

FIG. 10 further illustrates another tiled group 44 of SLMs 10 having a total surface area of 400 nm by 400 nm. In this example, the pixel is formed from an 8×8 array of SLMs 10, wherein each SLM 10 has a 6 nm passband tuned to a different center wavelength $\lambda$. The SLMs 10 are tiled sequentially from right to left and top to bottom, and the center wavelengths of the SLMs 10 increment at 6 nm intervals, so that the SLM 10 in the upper left hand corner of the array is tuned to pass or attenuate light at 384 nm, the SLM 10 to its immediate right is tuned to pass or attenuate light at 390 nm, and so on until the last SLM 10 in the lower right hand corner of the array, which is tuned to pass or attenuate light at 816 nm. In this manner the pixel is responsive to pass or attenuate light in a range from 384 nm to 816 nm. Since the entire array of SLMs 10 has a surface area measuring only 400 nm by 400 nm, an observer does not have to be far away from the pixel to see the desired reflective effect. FIG. 11 illustrates how the pixels 46 are combined together to form a screen 28 of a desired size.

Figure 12:
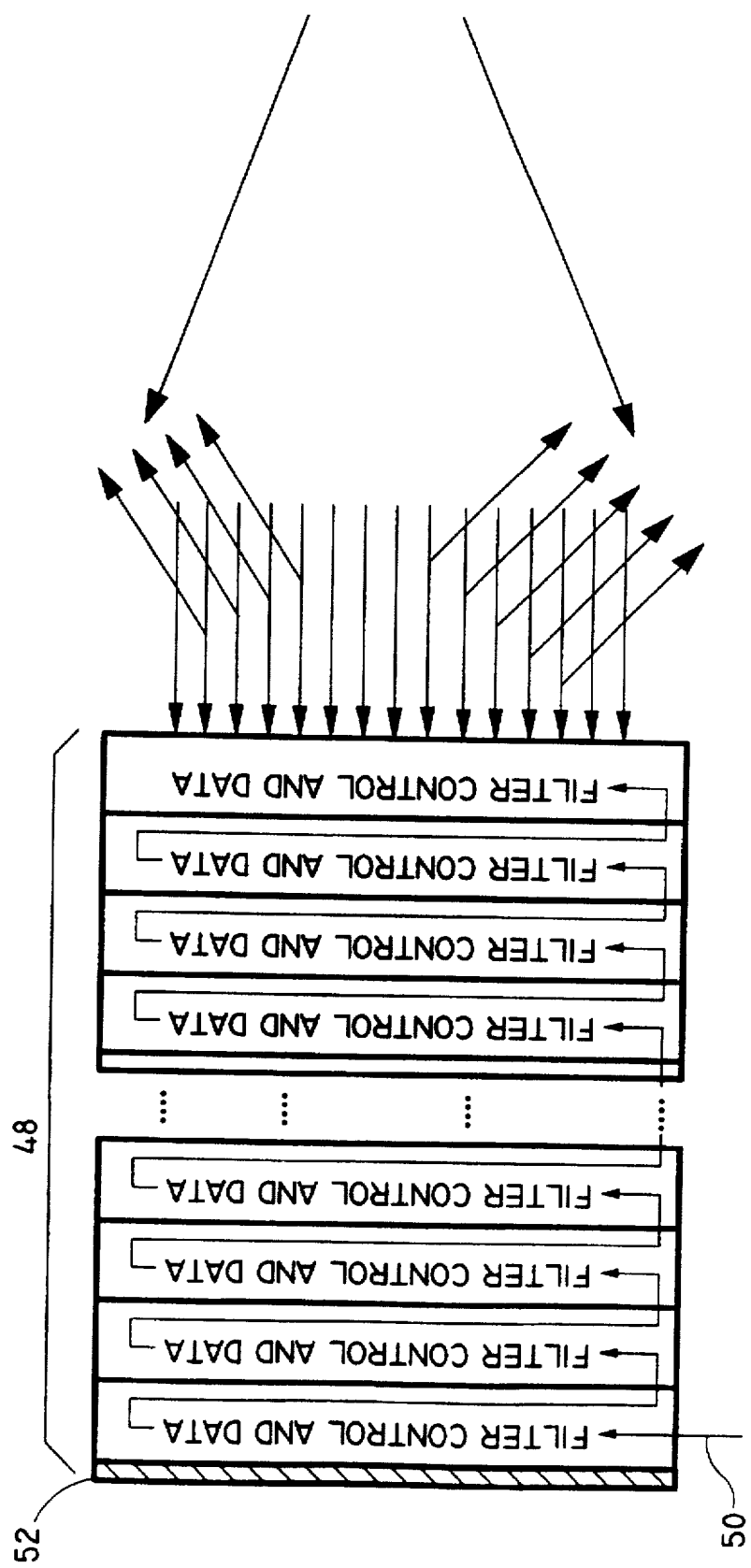
FIG. 12 illustrates the structure of a stack of reflective mode SLMs.

FIG. 12 illustrates the structure of a stack 48 of reflective mode SLMs 10. Filter, control and data lines 50 connect to all the SLMs 10. The stack 48 is 64 nm deep and is backed by deep black material 52, which is highly absorptive, placed behind the last SLM 10. Each SLM 10 is transparent except for its specific 6 nm passband. White light from a projector or scanning laser is shined onto the stack 48, and, depending on how the stack 48 is configured by the filter, control and data lines 50, the stack 48 will either reflect, pass or attenuate certain wavelengths. When taken together, the stack 48 reflects a color, and under a Fourier theory, the projected light can be decomposed to all of the different wavelengths in the visible spectrum. Everything that is outside of the passband of the stack 48 will pass through the stack and be absorbed by the deep black layer 52.

Figure 13:
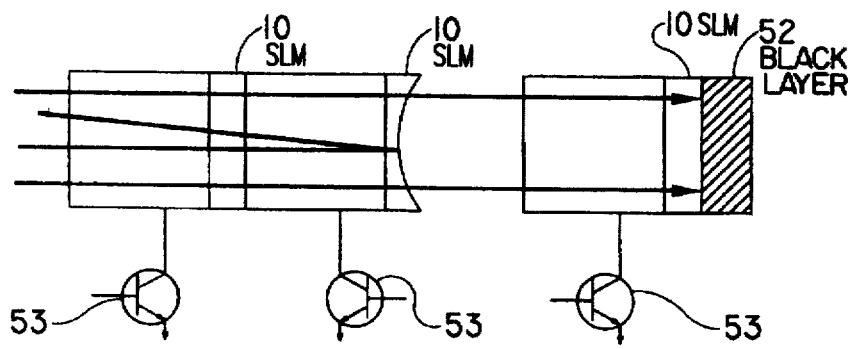
FIG. 13 illustrates the operation of the stack of reflective mode SLMs.

FIG. 13 illustrates the operation of the stack 48 of reflective mode SLMs 10, operated by control electronics 53, wherein some of the SLMs 10 are in the "on" position. In this example, the first SLM 10 from the left is in an "off" position, thereby allowing the light wavelengths for which it is tuned to pass through to the second SLM 10. The second SLM 10 from the left is in an "on" position as indicated by the deformed mirror, thereby allowing the light wavelengths for which it is tuned to be reflected, while the other wavelengths are passed through to the third SLM 10. The third SLM 10 from the left is in an "off" position, thereby allowing the light wavelengths for which it is tuned, as well as those outside its center wavelength, to pass through to the deep black layer 52 where these remaining wavelengths are absorbed.

REALITY BUBBLE

Figure 14:
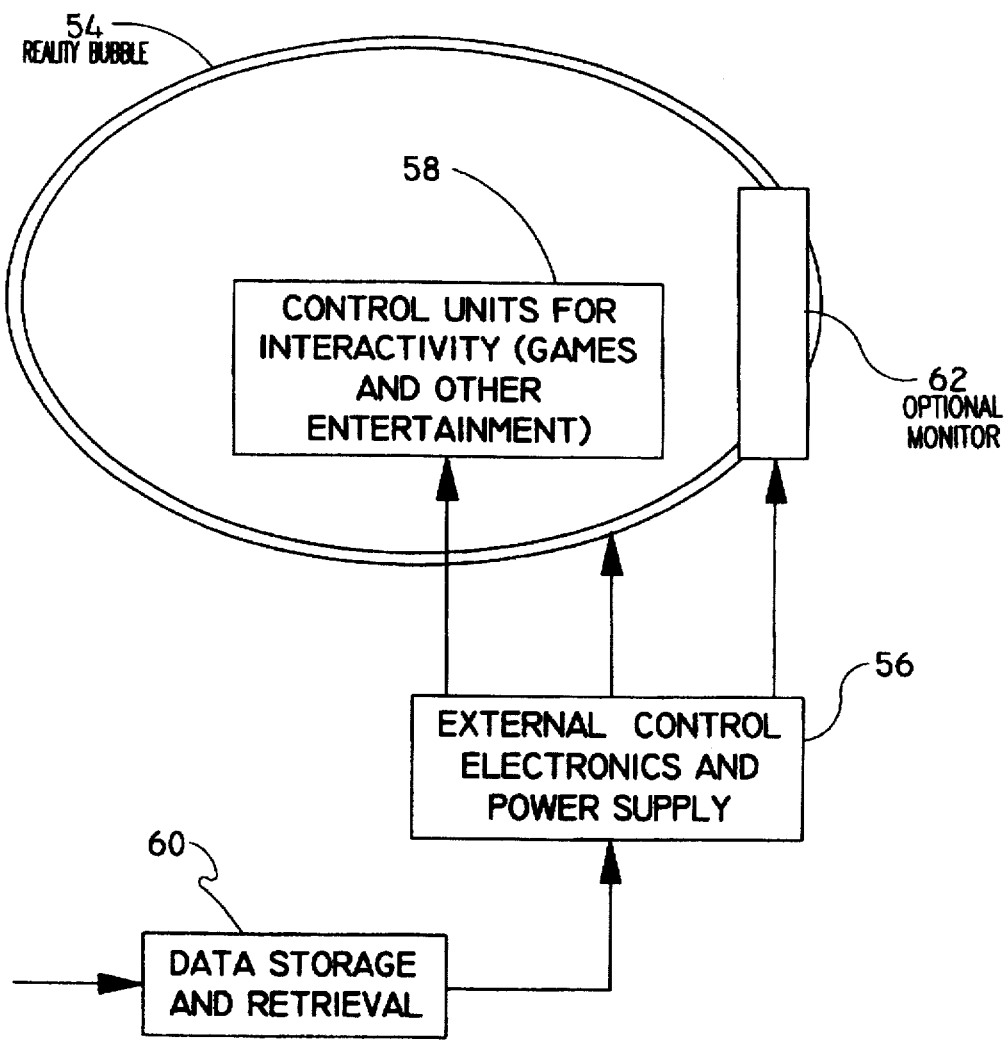
FIG. 14 illustrates an application of SLMs according to the present invention.

FIG. 14 illustrates an application of SLMs according to the present invention. A three-dimensional "reality bubble" 54 is a tent-like structure for enclosing a user. The bubble 54 could be made of canvas or any deformable material typically used for tents. Some or all of the inner portion of the bubble 54 is covered with reflective SLMs to create an optically active surrounding environment. Those skilled in the art will recognize that the SLMs could be used in many other two-dimensional and three-dimensional topologies. A control unit 56, which may be coupled to operator controls 58, a data storage device 60 and an optional monitor 62, controls the operation of the SLMs can be located within the bubble 56. In addition, the reality bubble 54 may also incorporate "sound bubble" technology disclosed and described in the co-pending and commonly assigned application Ser. No. 08/166,463, entitled "SOUND REPRODUCING ARRAY PROCESSOR SYSTEM," filed on Dec. 14, 1993, by Stephen C. Taylor, which application is incorporated herein by reference. Moreover, an analog of the SLMs can be used to create a sound bubble as described in more detail below.

SPATIAL ACOUSTIC MODULATORS

Figure 15:
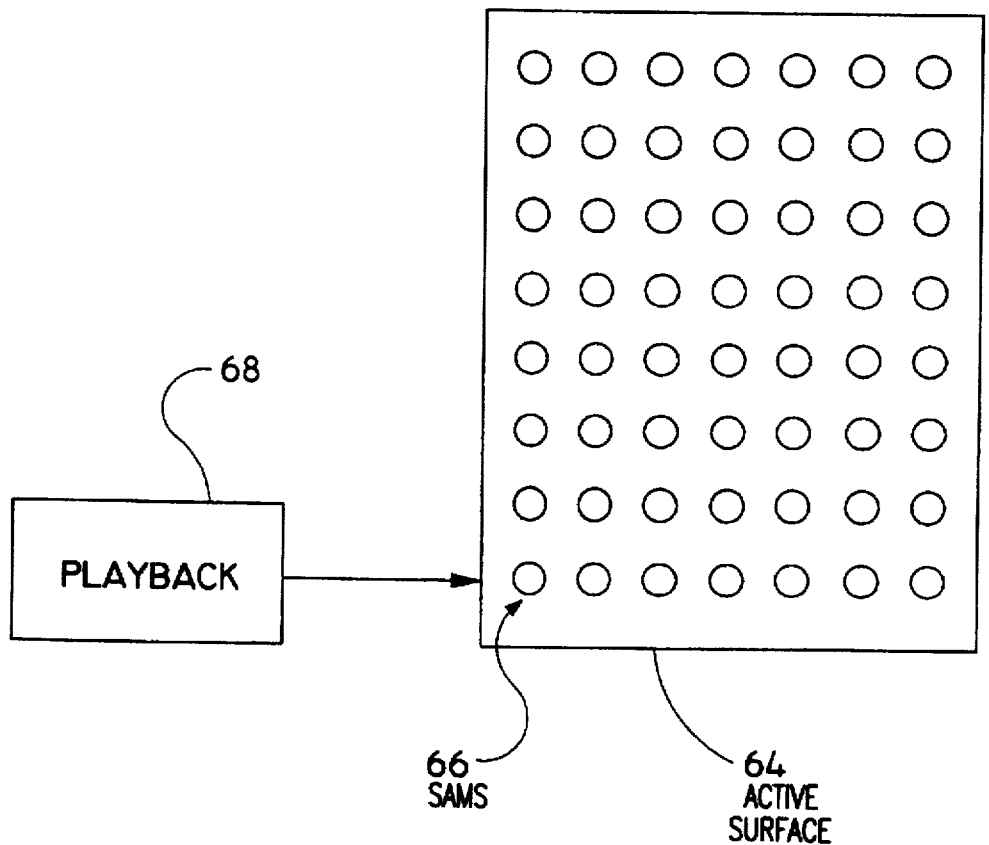
FIG. 15 illustrates an acoustically active surface comprised of a plurality of spatial acoustic modulators (SAMs)

FIG. 15 illustrates an acoustically active surface 64 comprised of a plurality of resonant membrane spatial acoustic modulators (SAMs) 66. The active surface 64 is deformable, and thus can be configured into any shape. The SAMS 66 are used to produce acoustical energy, so that the active surface 64 acts as an audio transducer. A playback system 68 provides the necessary audio data to control the operation of the SAMS 66. In many applications, the acoustically active surface 64 can be transparent so that SLMs can be placed behind the surface and used in conjunction with the SAMs.

Figure 16A:
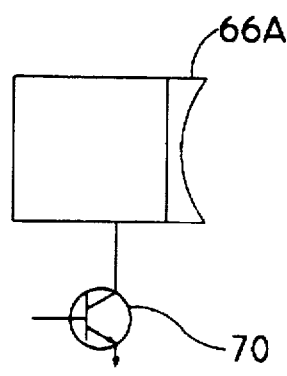
Figure 16B:
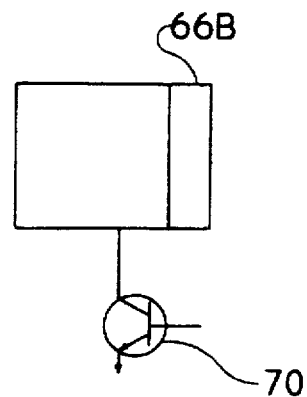

FIG. 16 illustrates the structure of a SAM 66a in full excursion, a SAM 66b in a quiescent state, and the necessary control electronics 70 for controlling the operation of the SAMs 66. The deflection of the support layer SAM 66b in a manner similar to SLMs generates the acoustical energy. In effect, the SAM 66 acts as a nano-transducer.

Figure 17:
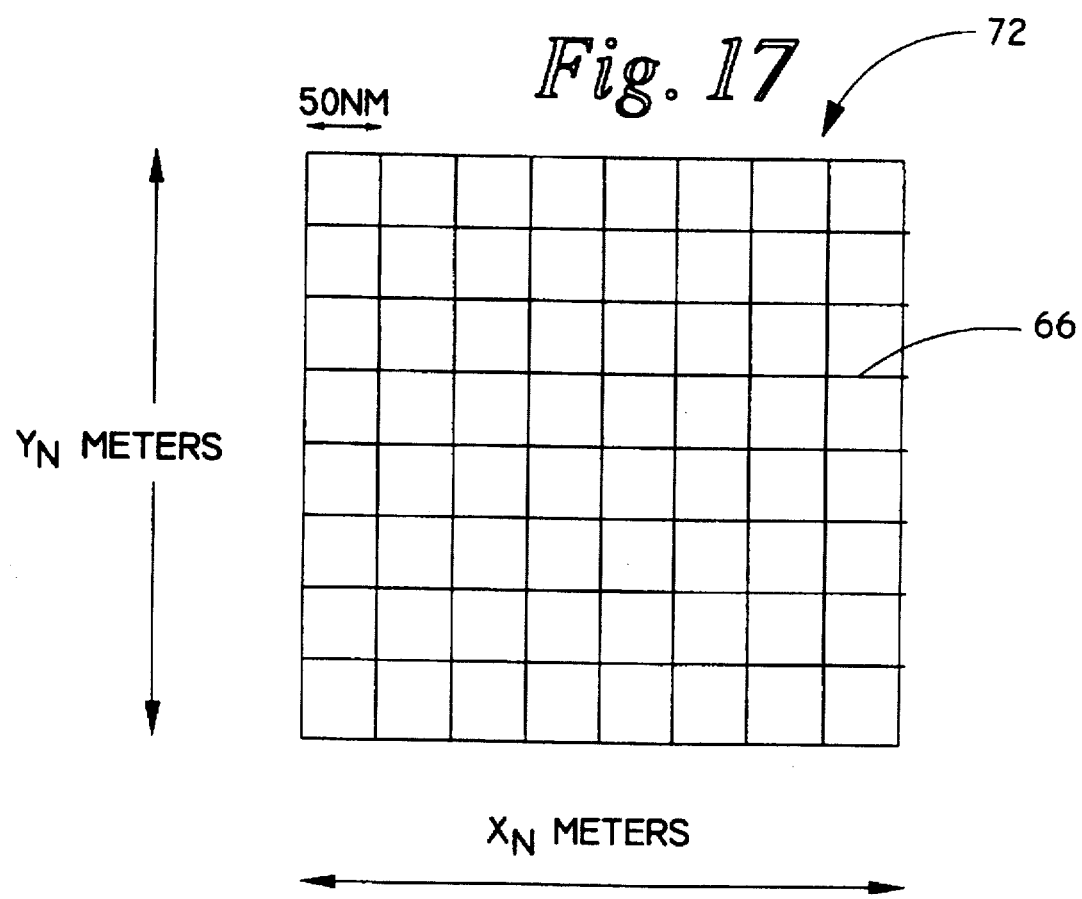
FIG. 17 illustrates a tiled group of SAMs forming a sound pixel.

FIG. 17 illustrates a tiled group of SAMs 66 forming a sound pixel 72. Each SAM 66 has an active surface area measuring 50 nm×50 nm. The SAMs 66 are grouped together in a matrix to form the sound pixel 72. The exact dimensions of the pixel 72 will vary with the application and by the number of SAMs 66 grouped therein.

Figure 18:
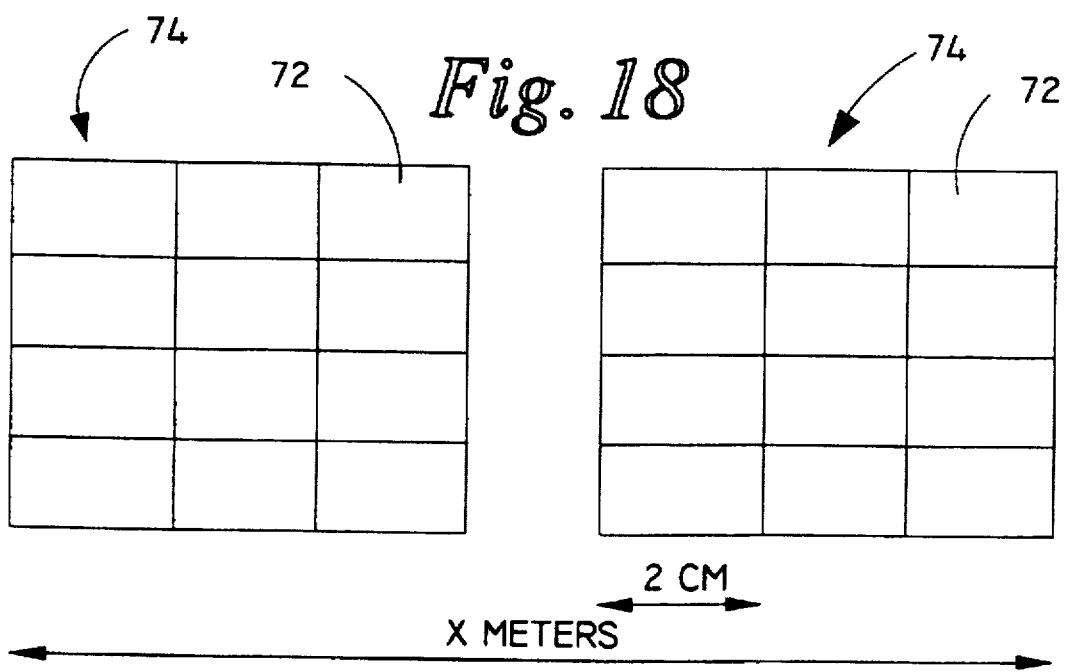
FIG. 18 illustrates tiled groups of sound pixels forming a screen.

FIG. 18 illustrates tiled groups 74 of sound pixels 72 forming a screen. Each pixel 72 has a surface area measuring 2 cm×2 cm. Depending on the amount of acoustical resolution required, adjoining groups of sound pixels 72 may be redundant and the sound pixels 72 may be combined into a tiled group 74 of sound pixels 72. The exact dimensions of the screen will vary with the application and by the number of sound pixels 72.

CONCLUSION

This concludes the description of the preferred embodiment of the invention. The present invention discloses applications of digitally-controlled nano-mechanical structures, including both digital video and audio systems. For video systems, the nano-mechanical structures comprise resonant membrane spatial light modulators (SLMs), which are used in either transmissive mode or reflective mode to generate images. For audio systems, the nano-mechanical structures comprise resonant membrane spatial acoustic modulators (SAMs), which are used in reflective mode to generate sounds. For both SLMs and SAMs, a flexible support layer is deformed upon application of an electrical potential to the device, thus altering either the optical or acoustical characteristics of the device, respectively.

The foregoing description of the preferred embodiment has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A digital video system, comprising:
   (a) a projection screen;
   (b) a projector including a light source for projecting light onto the projection screen; and
   (c) a lens, coupled to the projector, for transmitting light from the light source therethrough onto the projection screen, wherein the lens is comprised of an array of spatial light modulators to control the projection of an image onto the screen, wherein one or more of the spatial light modulators form the lens and each of the spatial light modulators passes light wavelengths without attenuation, when off and attenuates a particular light wavelength when on.

2. The invention as set forth in claim 1 above, further comprising electronic means for controlling the spatial light modulators to pass only a particular light wavelength.

3. The invention as set forth in claim 1 above, wherein the spatial light modulators are arranged in stacks, and one or more of the stacks form a pixel of the lens.

4. The invention as set forth in claim 3 above, wherein each of the spatial light modulators in a stack passes light wavelengths transparently when off and attenuates a different light wavelength λ when on.

5. The invention as set forth in claim 4 above, further comprising electronic means for controlling the spatial light modulators in a stack, so that the stack transmits only a particular light wavelength.

6. A digital video system, comprising:
   (a) a projection screen;
   (b) a projector including a light source for projecting light onto the projection screen; and
   (c) wherein the projection screen is comprised of an array of spatial light modulators controlled so as to reflect an image from the projection screen, wherein one or more of the spatial light modulators form a pixel of the projection screen, and each of the spatial light modulators passes light wavelengths when off and reflects a particular light wavelength λ when on.

7. The invention as set forth in claim 6 above, further comprising electronic means for controlling the spatial light modulators to reflect only a specific light wavelength.

8. The invention as set forth in claim 6 above, wherein the spatial light modulators are arranged in stacks, and one or more of the stacks form a pixel of the projection screen.

9. The invention as set forth in claim 8 above, wherein each of the spatial light modulators in a stack passes light wavelengths transparently when off and reflects a different light wavelength λ when on.

10. The invention as set forth in claim 9 above, further comprising electronic means for controlling the spatial light modulators in a stack, so that the stack reflects only a particular light wavelength.

11. The invention as set forth in claim 6 above, wherein the projection screen is deformable.

12. The invention as set forth in claim 6 above, further comprising a computer coupled to the projection screen, a data storage device coupled to the computer, and an operator control unit coupled to the computer, wherein the computer comprises means for controlling the operation of the spatial light modulators located within the projection screen.

* * * * *

UNITED STATES PATENT AND TRADEMARK OFFICE
CERTIFICATE OF CORRECTION

PATENT NO. : 5,699,130

DATED : December 16, 1997

INVENTOR(S) : Stephen F. Taylor

It is certified that error appears in the above-identified patent and that said Letters Patent is hereby corrected as shown below:

Column 6, line 50, strike "each of".

Signed and Sealed this

Twenty-second Day of June, 1999

Attest:

Q. TODD DICKINSON

*Attesting Officer*  *Acting Commissioner of Patents and Trademarks*